United States Patent
Fielder (10) Patent No.: US 7,127,886 B2
(45) Date of Patent: Oct. 31, 2006

(54) SELF-WINDING GENERATOR

(76) Inventor: William Sheridan Fielder, 1401 White Oak Cir., Ojai, CA (US) 93023

( * ) Notice: Subject to any disclaimer, the term of this patent is extended or adjusted under 35 U.S.C. 154(b) by 0 days.

(21) Appl. No.: 11/062,215

(22) Filed: Feb. 16, 2005

(65) Prior Publication Data

US 2005/0178113 A1   Aug. 18, 2005

Related U.S. Application Data

(60) Provisional application No. 60/545,306, filed on Feb. 17, 2004.

(51) Int. Cl.
| F03G 7/04 | (2006.01) |
| F03B 13/14 | (2006.01) |
| F03D 5/00 | (2006.01) |

(52) U.S. Cl. .............................. 60/398; 290/53; 290/54
(58) Field of Classification Search ................. 60/398; 290/53, 54
See application file for complete search history.

(56) References Cited

U.S. PATENT DOCUMENTS

| 3,393,771 | A | * | 7/1968 | Lohr et al. ..................... 185/37 |
| 4,013,382 | A | * | 3/1977 | Diggs ........................... 60/398 |
| 5,854,516 | A | * | 12/1998 | Shim ........................... 60/398 |
| 6,555,931 | B1 | * | 4/2003 | Mizzi ........................... 290/54 |
| 6,763,915 | B1 |  | 7/2004 | Nagao et al. |
| 6,924,571 | B1 | * | 8/2005 | Bye ........................... 290/1 E |

\* cited by examiner

*Primary Examiner*—Thomas E. Lazo (57) ABSTRACT

An uninterruptible rotational energy supply calibrated to provide constant rotational energy to electric generators and other apparatus in environments where fluctuations in kinetic energy are found. Such environments include the pause between the ebb and flow of the oceans' tides and waves as well as variations in the velocity of the oceans' currents. Wind-driven turbines may also be another beneficiary of this technology.

20 Claims, 7 Drawing Sheets

SELF-WINDING GENERATOR

CROSS-REFERENCE TO RELATED APPLICATIONS:

This application claims the benefit of provisional patent application Ser. No. 60/545,306, filed Feb. 17, 2004 by the present inventor.

FEDERALLY SPONSORED RESEARCH

Not applicable.

SEQUENCE LISTING OR PROGRAM

Not applicable.

BACKGROUND OF INVENTION

1. Field of Invention

This invention relates to energy capture systems, typically hydraulic turbines that capture the inconsistent kinetic energy found in the oceans' currents, tides, and waves, as well as wind turbines in need of a more regulated uninterrupted supply of rotational energy.

2. Prior Art

Previously energy capture systems that relied on inconstant sources of kinetic energy, such as wind turbines, had to make do. The only mechanism available to even out such inconstancies was found in self-winding watches. These mechanisms capture the kinetic energy of a swinging arm via a pendulum and store that energy in the watch's mainspring. The mainspring then releases the now potential energy as needed to drive the watch's arms.

The closest patent to this invention is U.S. Pat. No. 6,763,915 entitled "Mainspring Mechanism and Device Having the Same" by Nagao. Besides a form factor that is unsuitable for the environments mentioned above it also has a built-in brake which the present invention does not contain. This invention relies on an external rotary transmission means for regulating rotational energy.

3. Objects and Advantages

Accordingly, the objects and advantages of the invention are, the ability to store kinetic energy, and the ability to release it at a constant rate, for use in powering electric generators. This advantage is applicable to hydraulic and pneumatic turbine applications, providing an uninterruptible source of rotational energy.

SUMMARY

Hydroelectric power plants located adjacent to rivers and dams enjoy a constant supply of moving water to provide the kinetic energy for their turbines. This luxury is not available to hydroelectric power plants that rely on the oceans' currents, tides and waves, or to wind-driven turbines.

This invention utilizes the same concepts as the self-winding watch to provide the constant rotational energy necessary for electric generators.

DRAWINGS—REFERENCE NUMERALS 1. energy storage spring
2. Inner connecting element/cylinder
3. Outer surface of said inner connecting element/cylinder
4. Inner surface of said inner connecting element/cylinder
5. Outer connecting element/cylinder
6. Inner surface of said outer connecting element/cylinder
7. Outer surface of said outer connecting element/cylinder
8. Coil element representing a spring
9. Fastener, key and groove for said inner connecter element/cylinder
10. Fastener, key and grove, for said outer connecter element/cylinder
11. Rotational connecting element for said energy storage spring, in this case a gear
12. Axis of rotation for said energy storage spring
13. Axis of rotation for an energy capture system, a Hollow Turbine comprising: helical blades attached within a cylinder that is absent any center shaft.
14. Axis of rotation of a rotational energy connecting element, a gear
15. Rotational connecting element for said energy capture system, in this case a gear
16. Rotational connecting element, in this case a gear
17. Cylindrical element
18. Energy storage spring in the form of a spiral curve
19. Outer connecting point of said spiral energy storage spring
20. Inner connecting point of said spiral energy storage spring
21. Vacant space in said spiral energy storage spring
22. Cylindrical element
23. Energy capture system, in this case a Hollow Turbine comprising: helical blades attached within a cylinder that is absent any center shaft is depicted.
24. Protective housing

Figure 4:
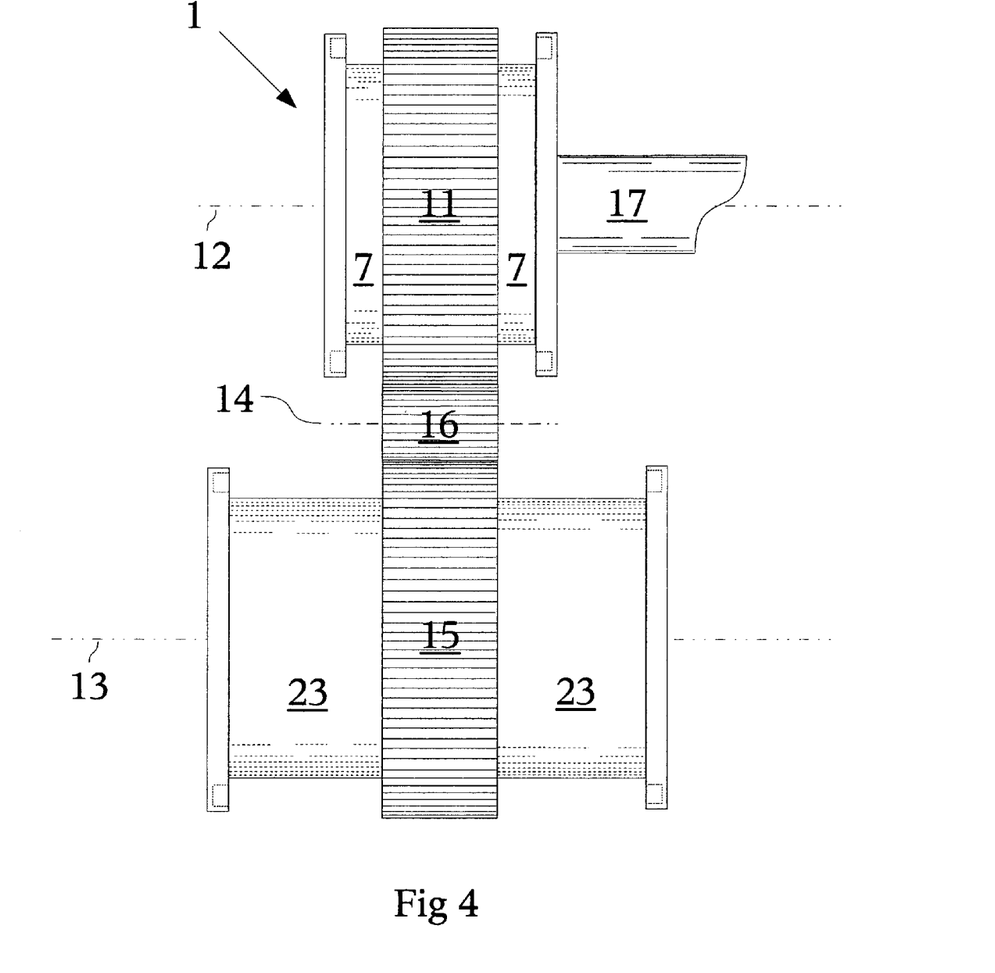
FIG. 4 depicts an energy capture system and the previous energy storage spring.

DETAILED DESCRIPTION—PREFERRED EMBODIMENT FIG. 4

Hollow Turbine comprising: helical blades attached within a cylinder that is absent any center shaft, an energy storage spring 1 that is equivalent to a watch's mainspring, support structure and bearings (not shown), an electric generator (not shown), and optional gear boxes/turbines (not shown). The energy capture system (E.C.S.) 23 is independent of the Self-Winding Generator; therefore the specific type of E.C.S. 23, hydraulic or pneumatic, is irrelevant so long as a means of engagement 16 is possible.

An optional gear box/transmission (not shown) positioned between the said energy capture system 23 and the outer surface 7 of energy storage spring 1 will allow for the independent operation. Another optional gear box/transmission (not shown) aligned between the energy storage spring (E.S.S.) 1 and the electric generator (not shown) will allow the E.S.S. 1, or multiple E.S.S.s 1 to store rotational energy to capacity before transferring that energy to the electric generator.

Figure 2:
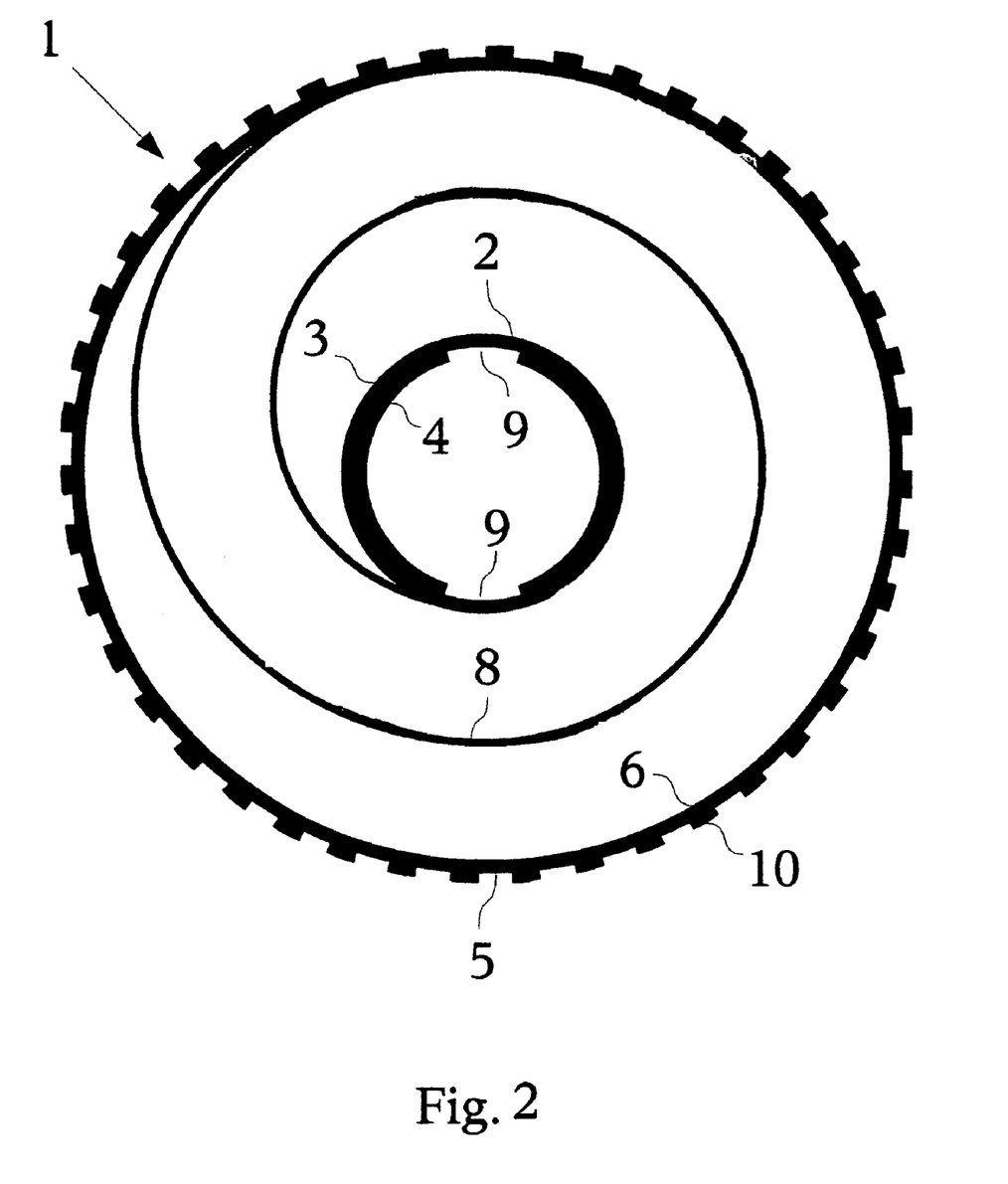
FIG. 2 is an energy storage spring with fasteners for both the inner and outer surfaces.
Figure 3:
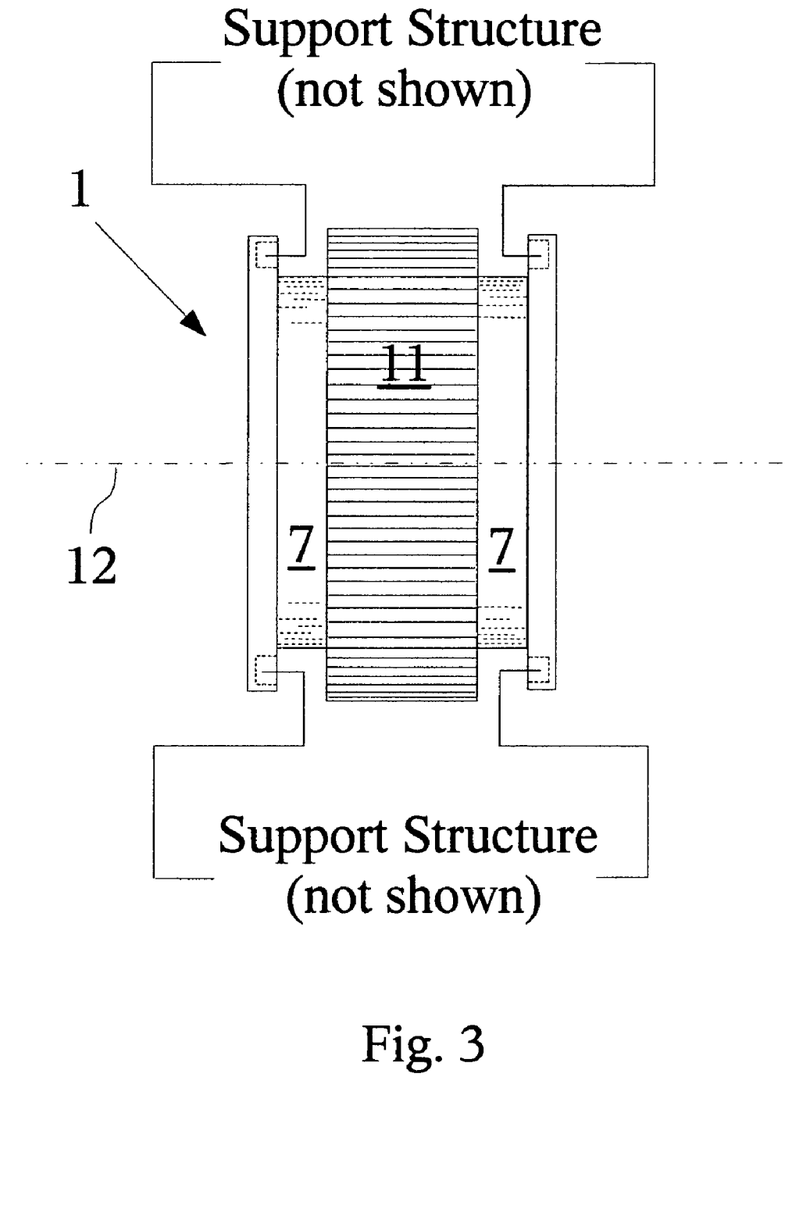
FIG. 3 is a side view of an energy storage spring showing the supporting structure's connecting points together with a rotational energy connecting element, in this case, a gear.

The spring 8 itself can be made of any material which is both flexible and strong enough to allow for the extreme pressures placed upon it. The said spring may take the form of a coil 8, with the axis of rotation at its center. The energy storage spring 1 will also provide a means for the engagement to both the energy capture system 23 and electric generator (not shown), such as a gear 10 and or key and groove fastener 9, FIG. 2. The said fasteners will ideally connect to a gearbox/transmission.

An electric generator (not shown) whose characteristics are application dependent will provide a means for the engagement 17 to the energy storage spring.

OPERATION OF INVENTON—PREFERRED EMBODIMENT FIG. 4

The Self-Winding Generator produces a constant supply of electricity by means similar to those incorporated into the once popular self-winding watch.

In the case of the self-winding watch, movement of the wearer's arm produces movement in a pendulum mechanism, which in turn adds tension or compression to an attached spring.

In the case of a turbine 23 deployed in wave or tidal environments, the turbine produces the kinetic energy and the energy storage spring 1 behaves in the same manner as the spring in a self-winding watch. This provides constant uninterrupted rotational energy during, for example, the transitions from ebb to flow of tides, or variations in the oceans' currents.

Figure 1:
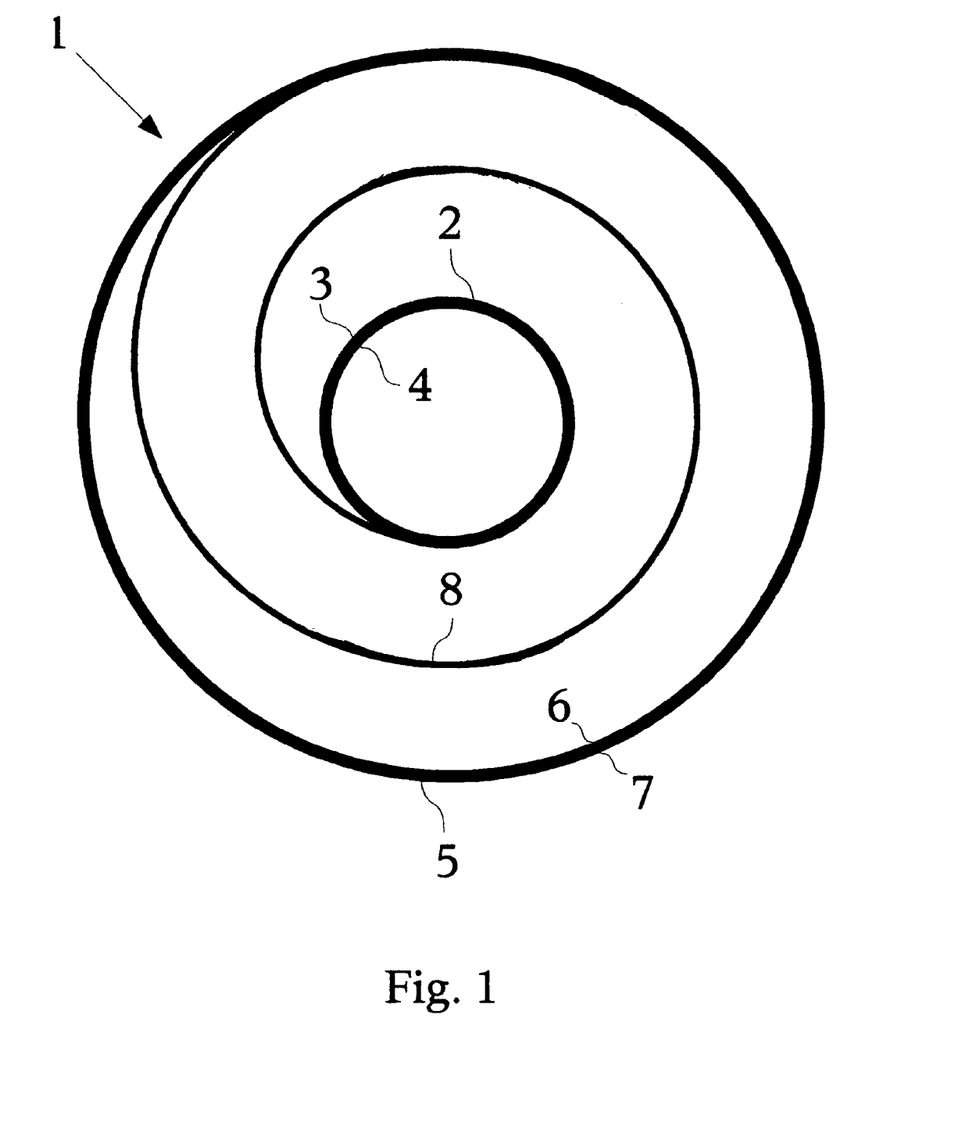
FIG. 1 is a generic energy storage spring where the said spring is formed in a coil such as that of a watch's mainspring.

The energy storage spring 1 produces a steady supply of rotational energy by first putting the said energy storage spring 1, or a plurality of such springs, in tension or compression. This is accomplished by engaging a turbine 23 or other energy capture system and transferring rotational energy 16. The outer connector 5, or center connector 2, FIG. 1, of the said energy storage spring 1, will rotate adding tension or compression to the said spring 8 until it has reached its maximum capacity. One end of the said spring 8 is rotated, while the other end remains fixed or rotates at a rate less than that of its opposing end. Energy transfer may be accomplished by means of an optional gear box/transmission (not shown) positioned between the said turbine 23 or other energy capture system (not shown) and the said energy storage spring 1.

Energy is transferred to the desired device attached to 17, usually an electric generator, by releasing tension or compression on the said energy storage spring 8 by means of a gear-box/transmission (not shown) engaged at either the center connecter 2 or at the outer surface 5 of the said energy storage spring 1.

Figure 5:
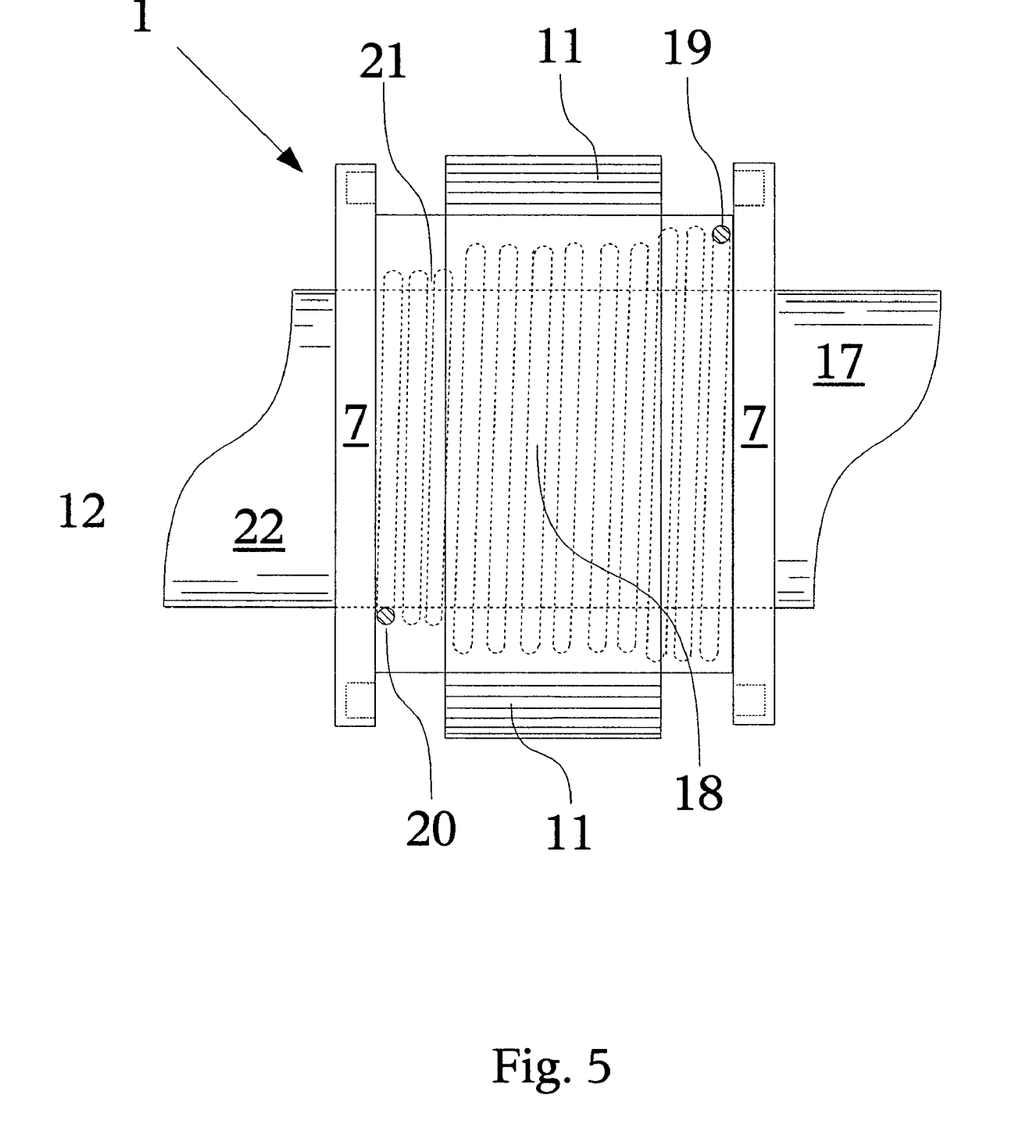
FIG. 5 is an alternative embodiment of the energy storage spring where the said spring is formed in a spiral curve such as that of a cork screw.

DETAILED DESCRIPTION—ALTERNATIVE EMBODIMENT FIG. 5

The Self-Winding Generator includes: an energy capture system 23 FIG. 4; an energy storage spring 1, equivalent to a watch's mainspring, and support structure and bearings (not shown); an electric generator (not shown); and optional gear boxes/turbines (not shown).

The energy capture system (E.C.S.) 23, FIG. 4, is independent of the Self-Winding Generator; therefore the specific type or E.C.S. 23, hydraulic or pneumatic, is irrelevant so long as a means of engagement 16, also FIG. 4, is possible.

An optional gear box/transmission (not shown) positioned between the said energy capture system 23, FIG. 4, and the energy storage spring's outer surface 7 will allow for the independent operation of both. Another optional gear box/transmission (not shown) aligned between the energy storage spring's outer surface 7 and an electric generator (not shown) will allow the E.S.S. 1, or multiple E.S.S.s 1, to store rotational energy to capacity before transferring that energy to the electric generator.

The said spring 18 itself can be made of any material which is both flexible and strong enough to allow for the extreme pressures placed upon it. The said spring may take the form of a spiral curve 18, such as that of a corkscrew, also with its center at the axis of rotation.

An electric generator (not shown) whose characteristics are application dependent will provide a means for the engagement 17 and or 22 to the energy storage spring 1.

OPERATION OF INVENTON—ALTERNATIVE EMBODIMENT FIG. 5

The Self-Winding Generator produces a constant supply of electricity by means similar to those incorporated into the once popular self-winding watch.

In the case of the self-winding watch, movement of the wearer's arm produces movement in a pendulum mechanism, which in turn adds tension or compression to an attached spring.

In the case of a turbine 23, FIG. 4, deployed in wave or tidal environments, the turbine produces the kinetic energy and the energy storage spring 1 behaves in the same manner as the spring in a self-winding watch. This provides constant uninterrupted rotational energy during, for example, the transitions from ebb to flow of tides, or variations in the oceans' currents.

The energy storage spring 1 produces a steady supply of rotational energy by first putting the spring 18, or a plurality of such springs, in tension or compression. This is accomplished by engaging a turbine 23, FIG. 4, or other energy capture system and transferring rotational energy 16, also FIG. 4. The outer connector 19, or center connector 20 of the said energy storage spring 18, will rotate adding tension or compression to the said spring until it has reached its maximum capacity. One end of the said spring is rotated, while the other end remains fixed or rotates at a rate less than that of its opposing end. Energy transfer may be accomplished by means of an optional gear box/transmission (not shown) positioned between the said turbine 23, FIG. 4, or other energy capture system (not shown) and the said energy storage spring 1.

Energy is transferred to the desired device attached to 17 and or 22, usually an electric generator, by releasing tension or compression on the said energy storage spring 1 by means of a gear-box/transmission (not shown) engaged at either the center connecter 20 or at the outer connecter 19 of the said energy storage spring 1.

Figure 6:
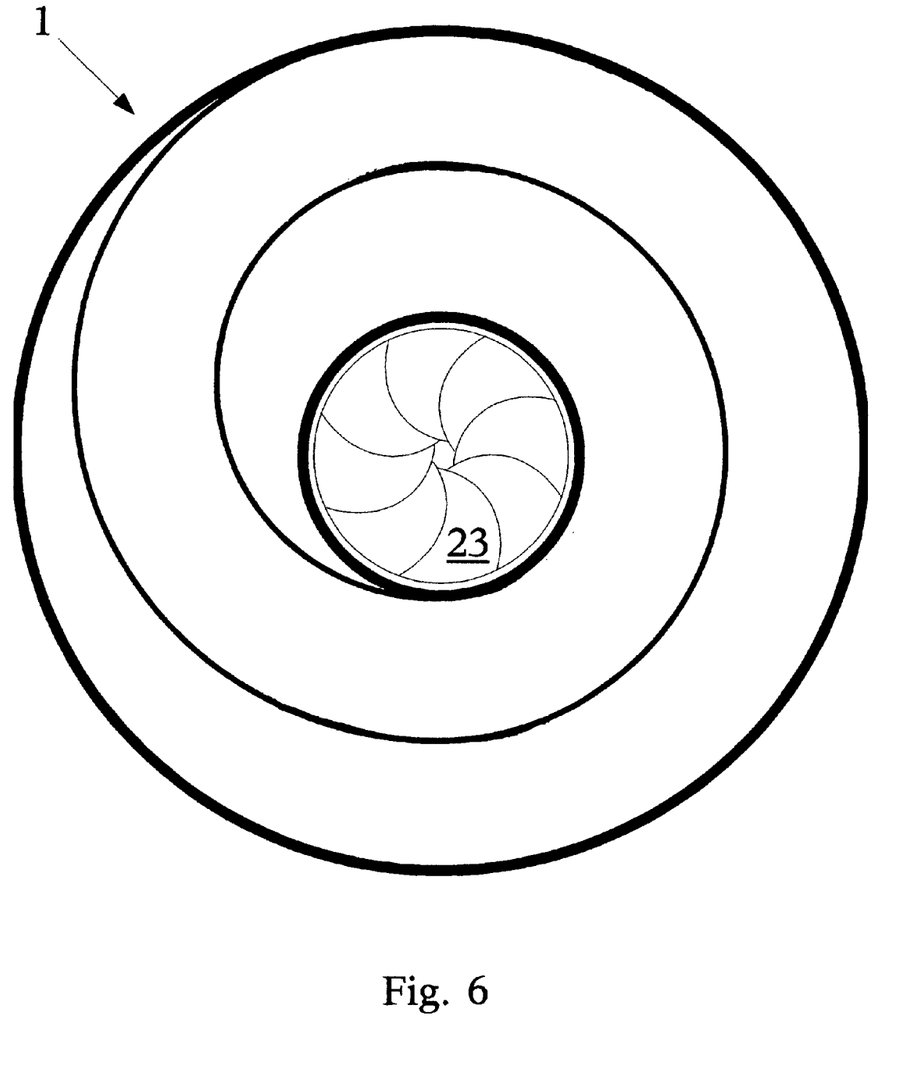
FIG. 6 is an alternative embodiment of a coiled (mainspring) energy storage spring with an embedded Hollow Turbine comprising: helical blades attached within a cylinder that is absent any center shaft.

DETAILED DESCRIPTION—ALTERNATIVE EMBODIMENT FIG. 6

FIG. 6 depicts a coil 8 (mainspring) implementation of the energy storage spring that may be installed around the outer surface of any turbine, occupying the space that would otherwise serve as the inner connection point 4 of the energy storage spring 1. Gears or a pulley system, not shown, will allow for traditional turbine design, where the center axis of rotation is occupied by apparatus such as a central shaft and support structure, as well as the electric generator itself. Serving as an energy capture system and depicted in FIG. 6 is a Hollow Turbine comprising: helical blades attached within a cylinder that is absent any center shaft 23.

Figure 7:
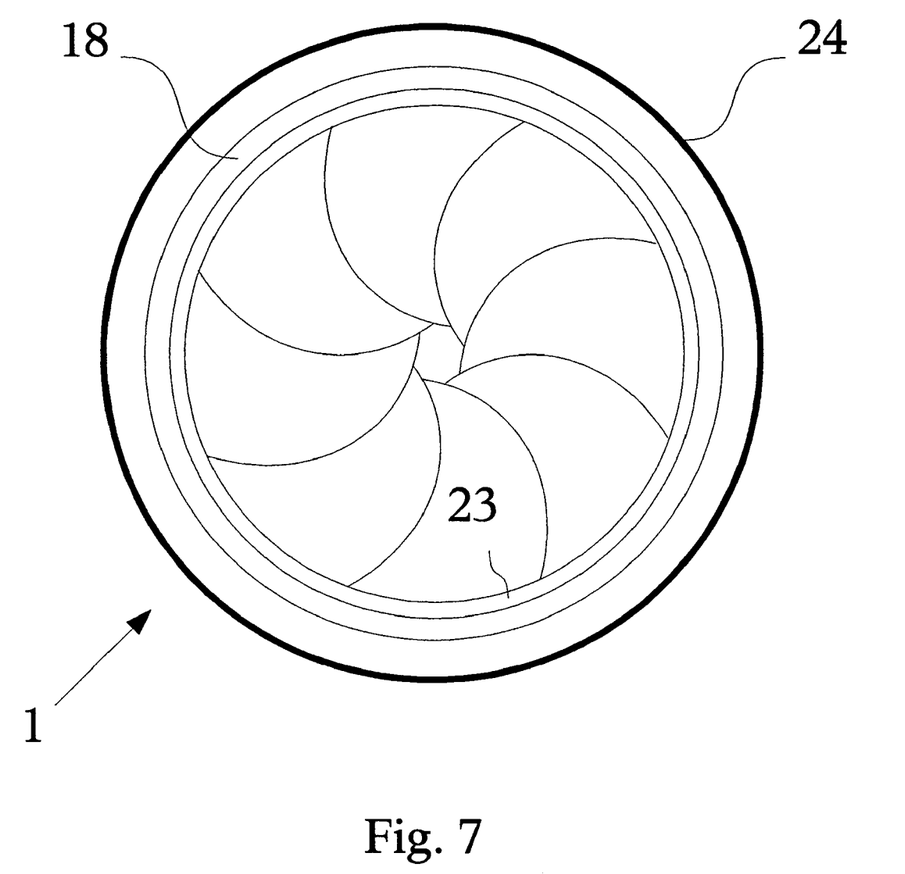
FIG. 7 is an alternative embodiment of a spiral (corkscrew) energy storage spring with an embedded Hollow Turbine comprising: helical blades attached within a cylinder that is absent any center shaft.

DETAILED DESCRIPTION—ALTERNATIVE EMBODIMENT FIG. 7

FIG. 7 depicts a spiral 18 (corkscrew) implementation of the energy storage spring that may be installed around the outer surface of any turbine, occupying the space that would otherwise serve as the inner connection point 4 of the energy storage spring 1. Gears or a pulley system, not shown, will allow for traditional turbine design, where the center axis of rotation is occupied by apparatus such as a central shaft and support structure, as well as the electric generator itself. Serving as an energy capture system and depicted in FIG. 6 is a Hollow Turbine comprising: helical blades attached within a cylinder that is absent any center shaft 23. Also shown is the outer protective housing 24.

OPERATION OF INVENTON—ALTERNATIVE EMBODIMENT FIGS. 6 AND 7

In these alternatives, embedded turbines 23, operation is the same as the preferred operation, with the exception of implementations where the electric generator, not shown, itself is embedded within the turbine's 23 support structure. In these installations gears and or a pulley system will transfer rotational energy to the electric generator instead of a transference through a gear box/transmission solution.

CONCLUSION, RAMIFICATIONS, AND SCOPE

The reader will see that according to the invention, I have provided the means to supply uninterruptible rotational energy, at a constant rate, in environments where inconstant sources of kinetic energy exist.

While the above description contains many specificity's, these should not be construed as limitations on the scope of the invention, but as exemplification's of the presently preferred embodiments thereof. Other ramifications and variations are possible within the teachings of the invention. For example, pneumatic energy capture systems may also benefit form the invention.

Thus the scope of the invention should be determined by the appended claims and their legal equivalents, and not by the examples given.

The invention claimed is:

1. Method and apparatus to overcome the inconstancy of kinetic energy found in the oceans' waves, tides, and currents for generating electricity comprising:
    at least one turbine;
    at least one energy storage spring to store the energy captured by the said at least one turbine;
    a means to engage the said at least one energy storage spring and said at least one turbine;
    at least one electric generator;
    a means to engage the said at least one energy storage spring and said at least one electric generator;
    whereby an uninterruptible, supply of rotational energy is provided at a constant rate from an inconstant source of kinetic energy.

2. The at least one turbine as claimed in claim 1, wherein said turbine comprises: helical blades attached within a cylinder that is absent any center shaft.

3. The at least one turbine as claimed in claim 1, wherein said turbine is a wind-driven turbine.

4. The at least one turbine as claimed in claim 1, wherein said turbine is embedded within the said energy storage spring and said attachment means.

5. The means of engaging the said at least one energy storage spring and the said at least one turbine as claimed in claim 1, wherein said means of engagement is at least one gear box/transmission.

6. The means of engaging the said at least one energy storage spring and the said at least one turbine as claimed in claim 1, wherein said means of engagement is at least one gear.

7. The means of engaging the said at least one energy storage spring and the said at least one turbine as claimed in claim 1, wherein said means of engagement is at least one pulley.

8. The means of engaging the said at least one energy storage spring and the said at least one electric generator as claimed in claim 1, wherein said means of engagement is at least one gear box/transmission.

9. The means of engaging the said at least one energy storage spring and the said at least one electric generator as claimed in claim 1, wherein said means of engagement is at least one gear.

10. The means of engaging the said at least one energy storage spring and the said at least one electric generator as claimed in claim 1, wherein said means of engagement is at least one pulley.

11. Method of generating electricity from an inconstant source of kinetic energy comprising:
    providing at least one turbine;
    providing at least one energy storage spring to store the energy captured by the said at least one turbine;
    providing at least one means of connecting said at least one turbine to said at least one energy storage spring;
    providing at least one electric generator;
    providing at least one means of connecting said at least one energy storage spring to said at least one electric generator;
    whereby an uninterruptible supply of rotational energy, at a constant rate, is provided from an inconstant source of kinetic energy.

12. The at least one turbine as claimed in claim 11, wherein said turbine comprises: helical blades attached within a cylinder that is absent any center shaft.

13. The at least one turbine as claimed in claim 11, wherein said turbine is a wind-driven turbine.

14. The at least one turbine as claimed in claim 11, wherein said turbine is embedded within the energy storage spring and said connecting means.

15. The source of inconstant kinetic energy as claimed in claim 11, wherein said source of inconstant kinetic energy is the ocean's tides.

16. The source of inconstant kinetic energy as claimed in claim 11, wherein said source of inconstant kinetic energy is the ocean's currents.

17. The source of inconstant kinetic energy as claimed in claim 11, wherein said source of inconstant kinetic energy is the wind.

18. The means of engaging the said at least one energy storage spring and the said at least one turbine as claimed in claim 11 wherein said means of engagement is at least one gear box/transmission.

19. The means of engaging the said at least one energy storage spring and the said at least one electric generator as claimed in claim 11 wherein said means of engagement is at least one gear box/transmission.

20. Method of generating electricity from an inconstant source of kinetic energy comprising:

providing at least one turbine comprising: helical blades attached within a cylinder that is absent any center shaft;

providing at least one energy storage spring to store the energy captured by the said at least one turbine;

providing at least one rotational energy connecting element to connect said at least one turbine to said at least one energy storage spring;

providing at least one electric generator;

providing at least one rotational energy connecting element to connect said at least one energy storage spring to said at least one electric generator;

whereby an uninterruptible supply of rotational energy, at a constant rate, is provided from an inconstant source of kinetic energy.

* * * * *